United States Patent
Kim et al.

(10) Patent No.: US 7,835,332 B2
(45) Date of Patent: Nov. 16, 2010

(54) METHOD AND APPARATUS FOR SCHEDULING IN WLAN MESH COMMUNICATION SYSTEM

(75) Inventors: Jae-Hoon Kim, Seoul (KR); Young-Gon Choi, Suwon-si (KR); Jung-Ho Kim, Suwon-si (KR); Ji-Hoon Lee, Cheongju-si (KR); Shubhranshu Singh, Yongin-si (KR); Yong-Sung Roh, Incheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1043 days.

(21) Appl. No.: 11/432,665

(22) Filed: May 12, 2006

(65) Prior Publication Data
US 2006/0268804 A1 Nov. 30, 2006

Related U.S. Application Data

(60) Provisional application No. 60/680,016, filed on May 12, 2005.

(30) Foreign Application Priority Data
Apr. 19, 2006 (KR) .................. 10-2006-0035412

(51) Int. Cl.
*H04W 4/00* (2009.01)
*H04L 12/26* (2006.01)

(52) U.S. Cl. ..................... 370/338; 370/245
(58) Field of Classification Search .......... 370/338, 370/401, 339, 245, 395.4; 455/509
See application file for complete search history.

(56) References Cited

U.S. PATENT DOCUMENTS
2003/0152054 A1 8/2003 Hirano et al.
2004/0013135 A1 1/2004 Haddad
2004/0114534 A1 6/2004 Benveniste
2004/0264428 A1 12/2004 Choi et al.
2005/0192037 A1 9/2005 Nanda et al.

(Continued)

FOREIGN PATENT DOCUMENTS
EP   1 059 773 A3   10/2003

(Continued)

OTHER PUBLICATIONS

A new MAC protocol for Wi-Fi mesh networks, Tzu-Jane Tsai; Hsueh-Wen Tseng; Ai-Chun Pang; Advanced Information Networking and Applications, 2006. 20th International Conference on vol. 1, Apr. 18-20, 2006 Page(s): 6 pp.

(Continued)

*Primary Examiner*—Melody Mehrpour
(74) *Attorney, Agent, or Firm*—NSIP Law

(57) ABSTRACT

A method and apparatus for scheduling in a Wireless Local Area Network (WLAN) mesh communication system including a plurality of Mesh Access Points (MAPs) are provided, in which, when a message to be transmitted from a first MAP of the MAPs to MAPs adjacent to first MAP is generated, setting a first interval for transmitting the generated message during a predetermined period, and setting a remaining interval excluding the first interval during the predetermined period as a second interval for receiving messages from the adjacent MAPs.

14 Claims, 3 Drawing Sheets

U.S. PATENT DOCUMENTS

2006/0251119 A1* 11/2006 Ramesh .................. 370/468
2006/0268908 A1* 11/2006 Wang et al. ............... 370/401
2007/0258428 A1* 11/2007 Zuniga et al. ............. 370/338

FOREIGN PATENT DOCUMENTS

| JP | 2002-335266 A | 11/2002 |
| KR | 10-2004-0055610 A | 6/2004 |
| KR | 10-2005-0003575 A | 1/2005 |

OTHER PUBLICATIONS

International Search Report issued on Aug. 25, 2006, in counterpart International Applicational No. PCT/KR2006/001785 (3 pages) (copy submitted on Sep. 25, 2006).

* cited by examiner

METHOD AND APPARATUS FOR SCHEDULING IN WLAN MESH COMMUNICATION SYSTEM

CROSS REFERENCE TO RELATED PATENT APPLICATIONS

This application claims the benefit under 35 U.S.C. §119 (e) of a U.S. Patent Application filed in United States Patent and Trademark Office on May 12, 2005 and assigned U.S. provisional application Ser. No. 60/680,016, and under 35 U.S.C. §119(a) filed in the Korean Intellectual Property Office on Apr. 19, 2006 and assigned Serial No. 2006-35412, the entire disclosure of both of which are incorporated by reference.

BACKGROUND OF THE INVENTION

1. Field of the Invention

The present invention relates to a Wireless Local Area Network (WLAN) mesh communication system. More particularly, the present invention relates to a scheduling method for transmitting and receiving a beacon message in a WLAN mesh communication system.

2. Description of the Related Art

In the next generation communication system, research for providing users with high speed services of various levels of Quality of Service (QoS) has been actively conducted. Specifically, research into a WLAN communication system has been performed on Institute of Electrical and Electronic Engineers (IEEE) 802.11 standards. Among the IEEE 802.11 standards, an IEEE 802.11s standard, in which a cable connection between Access Points (APs) is not required, has been actively developed. A WLAN communication system defined in the IEEE 802.11s standard is referred to as a "WLAN mesh communication system." The WLAN mesh communication system is mainly installed in an area in which it is difficult to install a general WLAN communication system defined in an IEEE 802.11a standard. Hereinafter, the general structure of a WLAN mesh communication system will be described with reference to FIG. 1.

FIG. 1 is a block diagram illustrating the general structure of the WLAN mesh communication system.

Referring to FIG. 1, the WLAN mesh communication system includes a Mesh AP Portal (MAPP) 111 connected to a wired network 101 by wire, a plurality of MAPs 121, 131, 141 and 151, and Subscriber Stations (SSs) 113, 115, 117, 123, 125, 127, 133, 135, 137, 143, 145, 147, 153, 155 and 157 for receiving a communication service from the MAPP 111 and the MAPs 121, 131, 141 and 151. The MAPP 111 functions as both a Mesh Point (MP) and an AP, and each of the MAPs 121, 131, 141 and 151 functions as both the MP and the AP.

The MAPP 111 performs the same functions as those of the MAPs 121, 131, 141 and 151, and also functions as a gateway of the WLAN mesh communication system by connecting a wireless network to the wired network 101 by wire. The MAPP 111 and the MAPs 121, 131, 141 and 151 form mesh links 161, 163, 165, 167 and 169. The formed mesh links 161, 163, 165, 167 and 169, or the MAPP 111 and the MAPs 121, 131, 141 and 151 all include MPs, so as to function as the MP, respectively. The MAPP 111 and the MAPs 121, 131, 141 and 151 function as the MP. Further, the MAPP 111 and the MAPs 121, 131, 141 and 151, which function as the AP, respectively include a predetermined number of SSs, so that local networks 110, 120, 130, 140 and 150 are formed.

In the meantime, the MAPP 111 and the MAPs 121, 131, 141 and 151 transmit beacon messages to adjacent MAPs or MAPP, and receive beacon messages from the adjacent MAPs or the MAPP. The beacon message includes both location information for reporting their own existence through each of the mesh links 161, 163, 165, 167 and 169 formed between the MAPP 111 and the MAPs 121, 131, 141 and 151, and performance information for reporting their own ability to function as the AP and the MP. Herein, the MAPP 111 and the MAPs 121, 131, 141 and 151 periodically transmit their own beacon messages to the adjacent MAPs or MAPP at regular intervals stipulated in the aforementioned IEEE 802.11s standard.

However, since the WLAN mesh communication system defined in the IEEE 802.11s standard has not stipulated both an interval, in which the MAPP 111 and the MAPs 121, 131, 141 and 151 transmit their own beacon messages, and an interval, in which the MAPP 111 and the MAPs 121, 131, 141 and 151 receive beacon messages from the adjacent MAPs or MAPP, many problems may occur in transmission/reception of the beacon messages of the MAPP 111 and the MAPs 121, 131, 141 and 151. For example, the second MAP 131 may receive beacon messages from the MAPP 111 and the MAPs 121, 141 and 151 while transmitting its own beacon message to the MAPP 111 and the MAPs 121, 141 and 151 between which the mesh links 161, 165, 167 and 169 have been formed. Further, after the second MAP 131 transmit its own beacon message, the second MAP 131 may receive the beacon message of the third MAP 141 from the third MAP 141, between which the mesh link 167 has been formed, while receiving the beacon message of the first MAP 121 from the first MAP 121. Therefore, mutual collision and interference may occur in the beacon messages transmitted/received at the same time as described above, so that the beacon messages may not be normally transmitted/received. Accordingly, the performance of the communication system may deteriorate. That is, since the WLAN mesh communication system defined in the IEEE 802.11s standard has stipulated only the transmission period of a beacon message, and has not considered a detailed scheduling method of a beacon period for the transmission/reception of a beacon message, it is necessary to provide the scheduling method for the transmission/reception of the beacon message.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and an apparatus for scheduling in a WLAN mesh communication system.

It is another object of exemplary embodiments of the present invention to provide a method and an apparatus for scheduling in order to transmit and receive a beacon message in a WLAN mesh communication system.

In order to accomplish the aforementioned object, according to one aspect of exemplary embodiments of the present invention, there is provided a method for scheduling in a Wireless Local Area Network (WLAN) mesh communication system including a plurality of Mesh Access Points (MAPs), in which a first interval for transmitting the generated message during a predetermined period is set, when a message to be transmitted from a first MAP of the MAPs to MAPs adjacent to the first MAP is generated, and a remaining interval excluding the first interval during the predetermined period is set as a second interval for receiving messages from the adjacent MAPs.

In order to accomplish the aforementioned object, according to another aspect of exemplary embodiments of the present, there is provided an apparatus for scheduling in a Wireless Local Area Network (WLAN) mesh communication system having a plurality of Mesh Access Points (MAPs), in which a first interval for transmitting the generated message during a predetermined period is set, when a message to be transmitted from a first MAP of the MAPs to MAPs adjacent to first MAP is generated, and a remaining interval excluding the first interval during the predetermined period is set as a second interval for receiving messages from the adjacent MAPs.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same reference numerals will be understood to refer to the same elements, features, and structures.

DETAILED DESCRIPTION OF EXEMPLARY EMBODIMENTS

Figure 1:
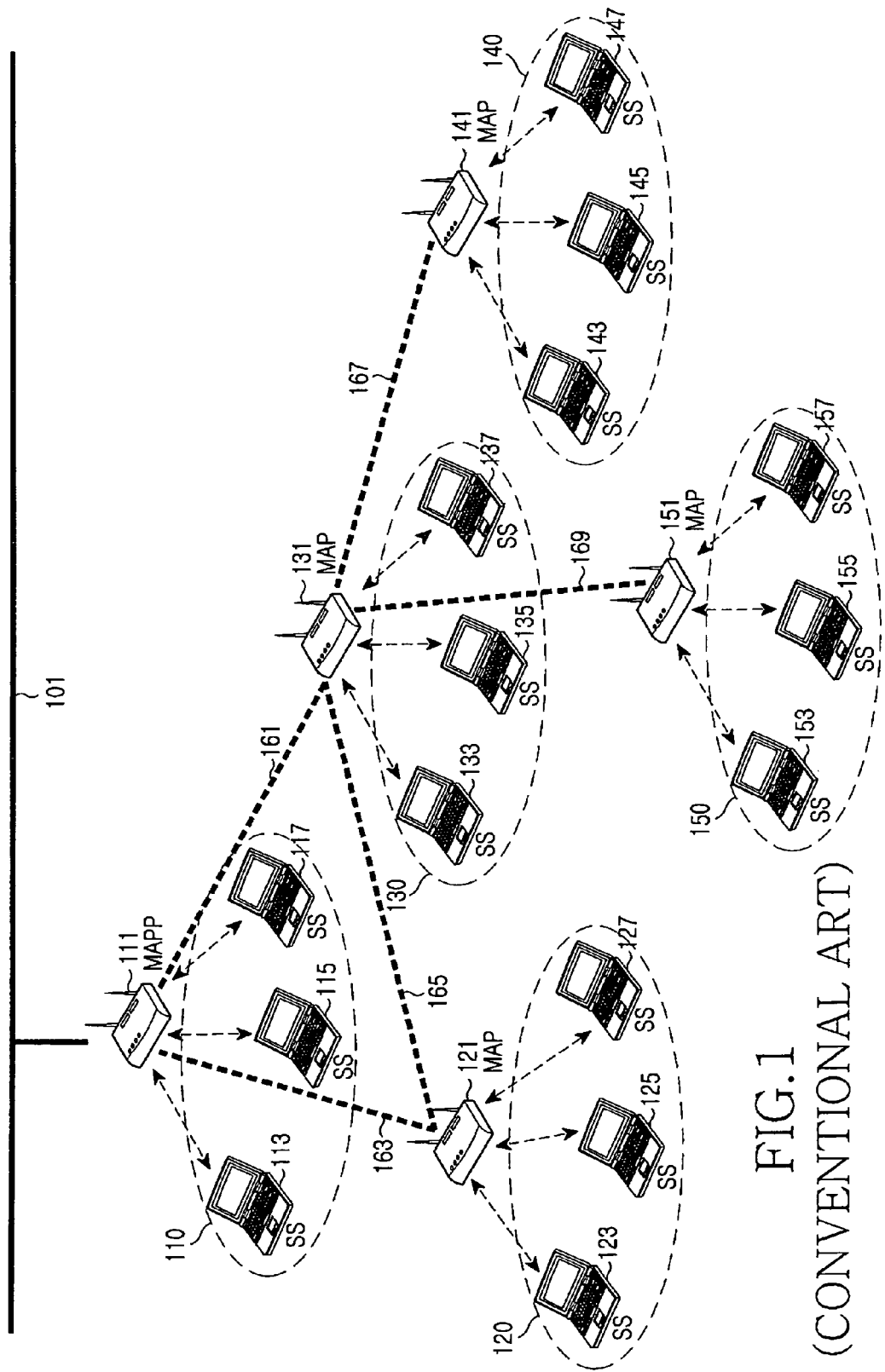
FIG. 1 is a block diagram illustrating the general structure of the WLAN mesh communication system.

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well known functions and constructions are omitted for clarity and conciseness.

The present invention proposes a method and an apparatus for scheduling in a Wireless Local Area Network (WLAN) mesh communication system. In the following exemplary embodiments of the present invention, the WLAN mesh communication system will be described as one example of an Institute of Electrical and Electronic Engineers (IEEE) 802.11 communication system. However, the method and the apparatus for scheduling in the WLAN mesh communication system proposed by the present invention can be applied to other WLAN mesh communication systems.

Further, certain exemplary embodiments of the present invention propose a method and an apparatus for scheduling in order to transmit and receive a beacon message in the WLAN mesh communication system. In the following exemplary embodiments of the present invention, the WLAN mesh communication system functions as a Mesh Point (MP) and an Access Point (AP), and a method and an apparatus for scheduling predetermined beacon periods in which a plurality of Mesh APs (MAPs) transmit/receive beacon messages are proposed, wherein the MAPs provide a communication service to users. In the following exemplary embodiments of the present invention, the WLAN mesh communication system includes a plurality of MAPs, and each of the MAPs transmits a beacon message to adjacent MAPs during the beacon periods, wherein the beacon message includes both location information for reporting its existence, and performance information for reporting its ability to function as the AP and the MP. Further, the following exemplary embodiments of the present invention propose a method and an apparatus for scheduling in order to receive beacon messages of the adjacent MAPs during the beacon periods.

The following exemplary embodiments of the present invention propose a method and an apparatus for scheduling in order to transmit and receive the beacon message in the WLAN mesh communication system. However, the method and the apparatus for scheduling can also be applied to a WLAN mesh communication system in which each of the MAPs transmits a probe request message to adjacent MAPs, and receives a probe response message from the adjacent MAPs. Similarly to the beacon message, the probe request message corresponds to a message transmitted from a certain MAP to the adjacent MAPs, inclusive of the location information and performance information of the certain MAP, in order to confirm that communication with the certain MAP is possible. The probe response message corresponds to a message which includes the location information and performance information of the adjacent MAPs, which are received from the adjacent MAPs in response to the probe request message, and represents that communication with the MAP that transmitted the probe request message is possible.

Figure 2:
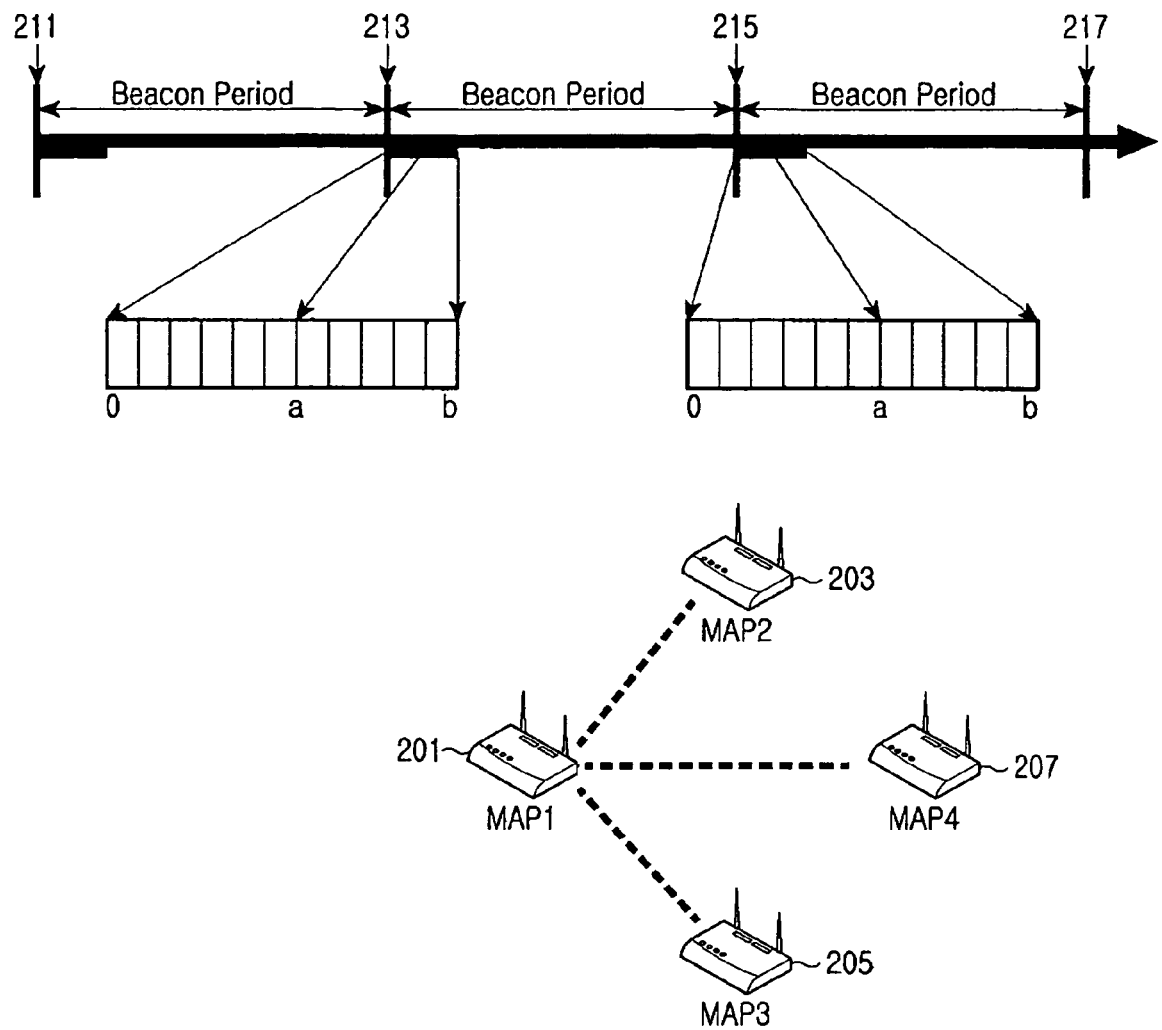
FIG. 2 is a diagram illustrating scheduling for transmitting a beacon message in a WLAN mesh communication system according to an exemplary embodiment of the present invention.

FIG. 2 is a diagram illustrating scheduling for transmitting the beacon message in the WLAN mesh communication system according to an exemplary embodiment of the present invention.

Referring to FIG. 2, the WLAN mesh communication system includes MAPs for forming mesh links and providing users with a communication service, that is, a first MAP 201, second MAP 203, third MAP 205 and fourth MAP 207. For convenience of description, FIG. 2 does not illustrate users who receive the communication service from the MAPs 201, 203, 205 and 207, and a Mesh AP Portal (MAPP) which functions as a gateway of the WLAN mesh communication system by connecting a wireless network to a wired network by wire. The mesh links are formed between the first MAP 201 and the second MAP 203, the first MAP 201 and the third MAP 205, and the first MAP 201 and the fourth MAP 207, respectively, and communication can be performed among the MAPs 201, 203, 205 and 207, that is, the beacon message can be transmitted/received among the MAPs 201, 203, 205 and 207. In the following exemplary embodiment of the present invention, for convenience of description, the first MAP 201 of the MAPs 201, 203, 205 and 207 initially transmits the beacon message.

In more detail, the first MAP 201 transmits the beacon message to the adjacent MAPs 203, 205 and 207 at an initial transmission time point 211. Herein, when a beacon message to be transmitted at the first time point 213 is generated after a beacon period passes from the initial transmission time point 211, the first MAP 201 having transmitted the beacon message sets a random seed value. That is, when the beacon message to be transmitted at the first time point 213 is generated, the first MAP 201 sets both an interval (0, a) for receiving beacon messages from the adjacent MAPs 203, 205 and 207, in response to the beacon message having been transmitted to the adjacent MAPs 203, 205 and 207 at the initial transmission time point 211, and an interval (a, b) for transmitting the subsequent beacon message generated at the first time point 213, before transmitting the generated beacon message. For convenience of description, the value b is a maximum value of the random seed value and the value a is equal to b/2.

When there are no beacon messages transmitted from the adjacent MAPs 203, 205 and 207 to the first MAP 201, the first MAP 201 determines the interval (0, a) for receiving the beacon messages from the adjacent MAPs 203, 205 and 207 as an unnecessary interval, sets the interval for transmitting the subsequent beacon message generated at the first time point 213 as a default value, and sets the interval for transmitting the subsequent beacon message as (0, b). Then, the first MAP 201 transmits the subsequent beacon message to the adjacent MAPs 203, 205 and 207 in the interval (0, b).

However, when there exist beacon messages transmitted from the adjacent MAPs 203, 205 and 207 to the first MAP 201, the first MAP 201 divides the interval (0, a) for receiving the beacon messages from the adjacent MAPs 203, 205 and 207 according to the number of the adjacent MAPs 203, 205 and 207. That is, each of the adjacent MAPs 203, 205 and 207 transmits its own beacon message to the first MAP 201 in the divided intervals. Herein, the adjacent MAPs 203, 205 and 207 have priority in the transmission of the beacon messages so that the first MAP 201 can normally receive the beacon messages transmitted from the adjacent MAPs 203, 205 and 207.

In other words, the adjacent MAPs 203, 205 and 207 have priority in the transmission of the beacon messages based on their own Medium Access Control (MAC) addresses according to a mutual agreement therebetween in the initial design of the WLAN mesh communication system. For example, when the second MAP 203 has the largest MAC address and the fourth MAP 207 has the smallest MAC address, the order in which the adjacent MAPs 203, 205 and 207 transmit the beacon messages to the first MAP 201 includes the second MAP 203 first transmits its own beacon message; then, the third MAP 205 transmits its own beacon message; lastly, the fourth MAP 207 transmits its own beacon message. That is, the first MAP 201 divides the interval (0, a) for receiving the beacon messages from the adjacent MAPs 203, 205 and 207 into three intervals, such as, the first interval, second interval and third interval. Then, the first MAP. 201 assigns the first interval to the second MAP 203, assigns the second interval to the third MAP 205, and assigns the third interval to the fourth MAP 207.

As described above, the first MAP 201 divides the set random seed value into the interval (a, b) for transmitting the beacon message of the first MAP 201 and the interval (0, a) for receiving the beacon messages from the adjacent MAPs 203, 205 and 207, that is, intervals in which the adjacent MAPs 203, 205 and 207 transmit their own beacon messages, respectively. Then, the first MAP 201 divides the interval (0, a) for receiving the beacon messages into intervals respectively corresponding to the adjacent MAPs 203, 205 and 207, and sequentially receives the beacon messages from the adjacent MAPs 203, 205 and 207 according to the priority of the adjacent MAPs 203, 205 and 207 in the divided intervals.

Then, at the second time point 215, the first MAP 201 transmits its own beacon message to the adjacent MAPs 203, 205 and 207 in the beacon message transmission interval (0, a) of the set random seed value. At the third time point 217, the first MAP 201 performs the same operation as that at the first time point 213. Hereinafter, the scheduling in which the adjacent MAPs 203, 205 and 207 receive the beacon message from the first MAP 201, and transmit their own beacon messages to the first MAP 201 will be described with reference to FIG. 3.

Figure 3:
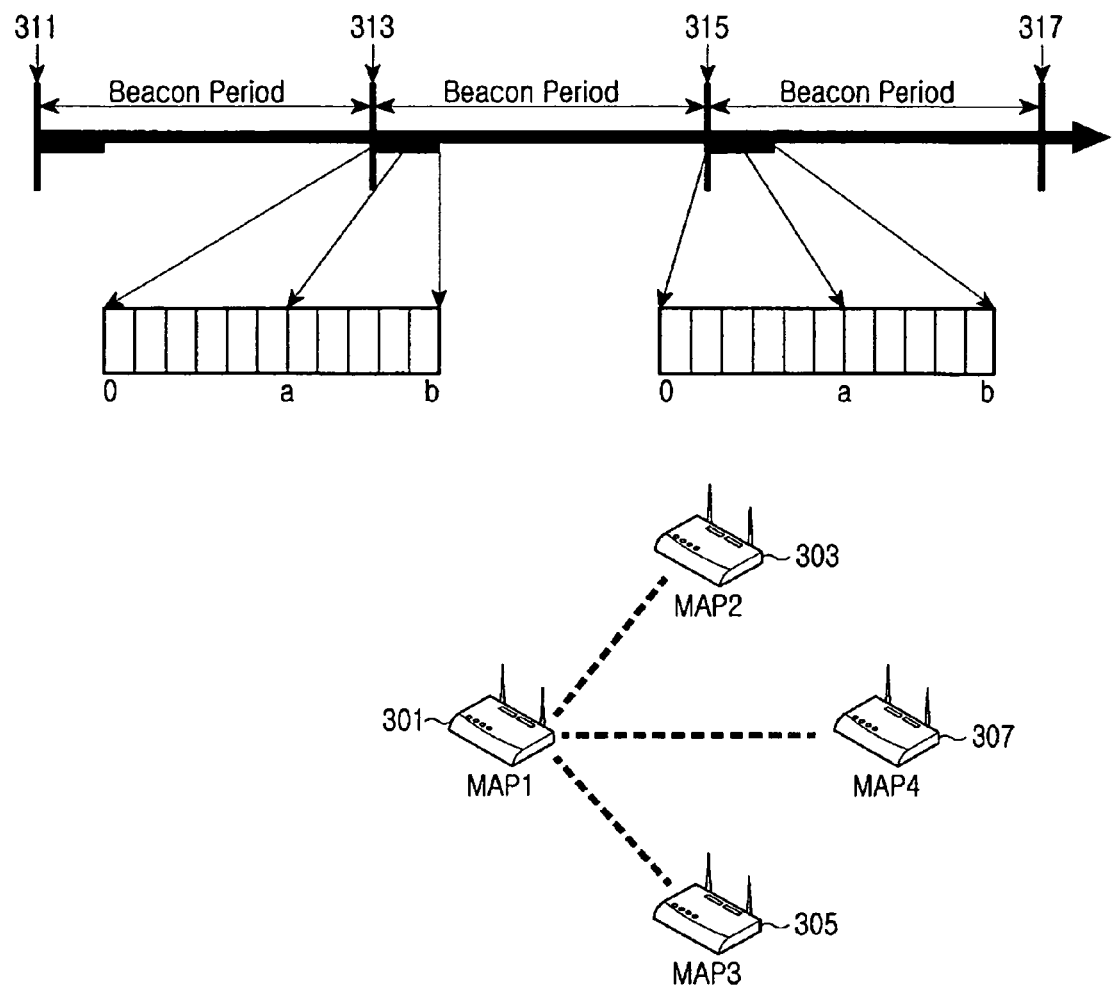
FIG. 3 is a diagram illustrating scheduling for receiving a beacon message in a WLAN mesh communication system according to an exemplary embodiment of the present invention.

FIG. 3 is a diagram illustrating scheduling for receiving the beacon message in the WLAN mesh communication system according to an exemplary embodiment of the present invention.

Referring to FIG. 3, the WLAN mesh communication system includes MAPs for forming mesh links and providing users with a communication service, such as, a first MAP 301, second MAP 303, third MAP 305 and fourth MAP 307. For convenience of description, as described in FIG. 2, the mesh links are formed between the first MAP 301 and the second MAP 303, the first MAP 301 and the third MAP 305, and the first MAP 301 and the fourth MAP 307, respectively, and communication can be performed among the MAPs 301, 303, 305 and 307, that is, the beacon message can be transmitted/received among the MAPs 301, 303, 305 and 307. In the following exemplary embodiment of the present invention, for convenience of description, the first MAP 301 of the MAPs 301, 303, 305 and 307 initially transmits the beacon message, and the MAPs 303, 305 and 307 transmit their own beacon messages to the first MAP 301, respectively, after receiving the beacon message from the first MAP 301.

In more detail, the adjacent MAPs 303, 305 and 307 receive the beacon message from the first MAP 301 at an initial reception time point 311. Herein, since beacon messages to be transmitted to the first MAP 301 from the adjacent MAPs 303, 305 and 307 exist, which have initially received the beacon message, at the first time point 313 after a beacon period passes from the initial reception time point 311, the first MAP 301 sets a random seed value. That is, when the beacon messages to be transmitted to the first MAP 301 from the adjacent MAPs 303, 305 and 307 are generated at the first time point 313, the random seed value is set as both an interval (0, a), in which the adjacent MAPs 303, 305 and 307 transmit the beacon messages to the first MAP 301, in response to the beacon message received in the adjacent MAPs 303, 305 and 307 at the initial reception time point 311, and an interval (a, b) for receiving a subsequent beacon message from the first MAP 301 at the first time point 313, before the generated beacon message is transmitted. For convenience of description, the value b is a maximum value of the random seed value and the value a is equal to b/2.

When beacon messages transmitted from the adjacent MAPs 303, 305 and 307 to the first MAP 301 exist, the interval (0, a), in which the adjacent MAPs 303, 305 and 307 transmit the beacon messages to the first MAP 301, is divided according to the number of the adjacent MAPs 303, 305 and 307. That is, each of the adjacent MAPs 303, 305 and 307 transmits its own beacon message to the first MAP 301 in the divided intervals. Herein, the adjacent MAPs 303, 305 and 307 have priority in the transmission of the beacon messages so that the first MAP 301 can normally receive the beacon messages from the adjacent MAPs 303, 305 and 307.

In other words, the adjacent MAPs 303, 305 and 307 have priority in the transmission of the beacon messages based on their own MAC addresses according to a mutual agreement therebetween in the initial design of the WLAN mesh communication system. For example, when the second MAP 303 has the largest MAC address and the fourth MAP 307 has the smallest MAC address, the order in which the adjacent MAPs 303, 305 and 307 transmit the beacon messages to the first MAP 301 includes the second MAP 303 first transmits its own beacon message; then, the third MAP 305 transmits its own beacon message; lastly, the fourth MAP 307 transmits its own beacon message. That is, the adjacent MAPs 303, 305 and 307 divide the interval (0, a) for transmitting their own beacon messages into three intervals, such as, the first interval, second interval and third interval. Further, the second MAP 303 transmits its own beacon message in the first interval, the third MAP 305 transmits its own beacon message in the second interval, and the fourth MAP 307 transmits its own beacon message in the third interval.

As described above, the set random seed value is divided into the interval (a, b) for receiving the beacon message from the first MAP 301 and the interval (0, a) in which the adjacent MAPs 303, 305 and 307 transmit their own beacon messages to the first MAP 301. The interval (0, a) is divided into intervals respectively corresponding to the adjacent MAPs 303, 305 and 307, and the adjacent MAPs 303, 305 and 307 sequentially transmit their own beacon messages to the first MAP 301 in the divided intervals according to the priority.

Then, at the second time point 315, the adjacent MAPs 303, 305 and 307 receive the beacon message from the first MAP 301 in the beacon message reception interval (0, a) of the set random seed value. Further, the adjacent MAPs 303, 305 and 307 transmit their own beacon messages to the first MAP 301 in the beacon message transmission interval (a, b), and then perform the same operation as that at the second time point 315 as described above, at the third time point 317.

According to the present invention as described above, a WLAN mesh communication system divides a predetermined beacon period into an interval for transmitting a beacon message and an interval for receiving a beacon message, so that it is possible to prevent collision, interference, and the like, of the beacon message in transmission/reception of the beacon message. Accordingly, it is possible to normally receive the beacon message. In addition, the beacon message is normally received, so that the performance of the communication system can be improved.

While the invention has been shown and described with reference to certain exemplary embodiments thereof, it will be understood by those skilled in the art that various changes in form and details may be made therein without departing from the spirit and scope of the invention as defined by the appended claim and their equivalents.

What is claimed is:

1. A method for scheduling in a Wireless Local Area Network (WLAN) mesh communication system comprising a plurality of Mesh Access Points (MAPs), the method comprising the steps of:
   when a message to be transmitted from a first MAP of the MAPs to MAPs adjacent to the first MAP is generated, setting a first interval for transmitting the generated message during a period; and
   setting a remaining interval excluding the first interval during the period as a second interval for receiving messages from the adjacent MAPs.

2. The method as claimed in claim 1, wherein the messages transmitted from the first MAP and the adjacent MAPs correspond to beacon messages comprising location information and performance information of respective ones of the first MAP and the adjacent MAPs.

3. The method as claimed in claim 1, wherein the second interval is set by dividing the remaining interval excluding the first interval during the period into at least one interval according to a number of the adjacent MAPs.

4. The method as claimed in claim 3, wherein the divided intervals correspond to the adjacent MAPs according to priority of the adjacent MAPs.

5. The method as claimed in claim 4, wherein the priority of the adjacent MAPs is determined according to Medium Access Control (MAC) addresses of the adjacent MAPs.

6. The method as claimed in claim 4, wherein the first MAP receives the message through the divided intervals respectively corresponding to the adjacent MAPs.

7. An apparatus for scheduling in a Wireless Local Area Network (WLAN) mesh communication system comprising a plurality of Mesh Access Points (MAPs), the apparatus comprising a scheduler for, when a message to be transmitted from a first MAP of the MAPs to MAPs adjacent to the first MAP is generated, setting a first interval for transmitting the generated message during a period, and setting a remaining interval excluding the first interval during the period as a second interval for receiving messages from the adjacent MAPs.

8. The method as claimed in claim 7, wherein the messages transmitted from the first MAP and the adjacent MAPs correspond to beacon messages comprising location information and performance information of respective ones of the first MAP and the adjacent MAPs.

9. The method as claimed in claim 7, wherein the second interval is set by dividing the remaining interval excluding the first interval during the period into at least one interval according to a number of the adjacent MAPs.

10. The method as claimed in claim 9, wherein the divided intervals correspond to the adjacent MAPs according to priority of the adjacent MAPs.

11. The method as claimed in claim 10, wherein the priority of the adjacent MAPs is determined according to Medium Access Control (MAC) addresses of the adjacent MAPs.

12. The method as claimed in claim 10, wherein the first MAP receives the message through the divided intervals respectively corresponding to the adjacent MAPs.

13. A method of scheduling in a Wireless Local Area Network (WLAN) mesh communication system comprising a plurality of Mesh Access Points (MAPs), the method comprising the steps of:
   dividing a portion of at least one beacon period into a plurality of intervals;
   setting a first interval of the plurality of intervals to allow a first MAP of the plurality of MAPs to receive or transmit a generated message during the first interval; and
   setting the plurality of intervals which have not been set to be able to receive or transmit messages from the plurality of MAPs.

14. The method of claim 13, wherein each of the plurality of intervals are set to only one of the plurality of MAPs to either receive or transmit a message.

* * * * *